United States Patent
Katoh

(10) Patent No.: US 9,975,550 B2
(45) Date of Patent: May 22, 2018

(54) MOVEMENT TRAJECTORY PREDICTING DEVICE AND MOVEMENT TRAJECTORY PREDICTING METHOD

(71) Applicant: TOYOTA JIDOSHA KABUSHIKI KAISHA, Toyota-shi, Aichi-ken (JP)

(72) Inventor: Masayuki Katoh, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days. days.

(21) Appl. No.: 14/892,468

(22) PCT Filed: May 31, 2013

(86) PCT No.: PCT/JP2013/065198
§ 371 (c)(1),
(2) Date: Nov. 19, 2015

(87) PCT Pub. No.: WO2014/192137
PCT Pub. Date: Dec. 4, 2014

(65) Prior Publication Data
US 2016/0101779 A1 Apr. 14, 2016

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *G06K 9/00791* (2013.01);
(Continued)

(58) Field of Classification Search
CPC .............. B60W 30/0956; B60W 30/09; G06K 9/00791; G06K 9/00805; G06K 9/4604;
(Continued)

(56) References Cited

U.S. PATENT DOCUMENTS

2003/0130794 A1* 7/2003 Miller .................... G08G 1/164
701/301
2008/0158042 A1* 7/2008 Ishio ..................... G01S 7/4868
342/54

(Continued)

FOREIGN PATENT DOCUMENTS

JP 2003-081037 A 3/2003
JP 2009-214832 A 9/2009

*Primary Examiner* — James Yang
(74) *Attorney, Agent, or Firm* — Sughrue Mion, PLLC

(57) ABSTRACT

An object of the invention is to accurately predict a movement trajectory of an object from a history of positions of the object even in a case where shaking or deflection of a vehicle occurs. In order to achieve the object, in the invention, the position of the object around the vehicle is acquired (S1), a ground speed of the object is acquired (S3), a slope θ of a trajectory prediction vector (relative movement vector) of the object with respect to the vehicle is calculated by using a speed of the vehicle and the ground speed of the object (S7), fitting is performed (classification of the recorded positions of the object in the movement trajectory) with respect to the history of the positions of the object with a straight line having the slope θ of the trajectory prediction vector (S8), and a straight line having the slope θ of the position fitting best in the straight line having the slope θ (straight line having a plurality of positions included in a group classified through the fitting) is predicted as the movement trajectory of the object (S9).

8 Claims, 12 Drawing Sheets

(51) Int. Cl.
*G06K 9/00* (2006.01)
*G08G 1/16* (2006.01)
*G06K 9/46* (2006.01)
*G06K 9/52* (2006.01)
*G06K 9/62* (2006.01)
*G06T 7/20* (2017.01)
*G06T 7/60* (2017.01)
*G06T 7/73* (2017.01)
*G06T 7/13* (2017.01)

(52) U.S. Cl.
CPC ....... *G06K 9/00805* (2013.01); *G06K 9/4604* (2013.01); *G06K 9/52* (2013.01); *G06K 9/6267* (2013.01); *G06T 7/13* (2017.01); *G06T 7/20* (2013.01); *G06T 7/60* (2013.01); *G06T 7/73* (2017.01); *G08G 1/166* (2013.01); *G06T 2207/30241* (2013.01); *G06T 2207/30252* (2013.01)

(58) Field of Classification Search
CPC ...... G06K 9/52; G06K 9/6267; G06T 7/0042; G06T 7/0085; G06T 7/20; G06T 7/60; G06T 2207/30241; G06T 2207/30252; G08G 1/166
See application file for complete search history.

(56) References Cited

U.S. PATENT DOCUMENTS

2011/0190972 A1\* 8/2011 Timmons ............... G01C 21/34
 701/31.4
2014/0067220 A1\* 3/2014 Seiler ....................... B60T 7/12
 701/70

\* cited by examiner

FIG.4
(a)
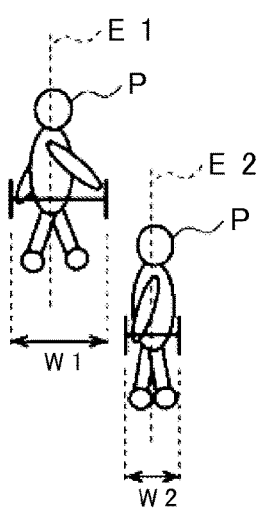
(b)
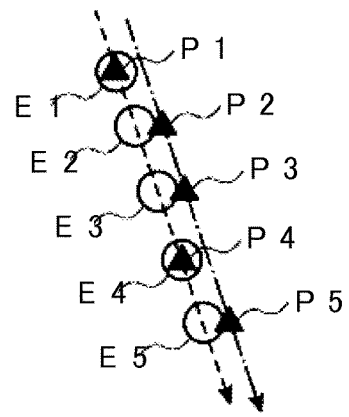

FIG.8

| DETECTED POSITION | WEIGHT |
|---|---|
| D1 | 1 |
| D2 | 1 |
| D3 | 2 |
| D4 | 2 |
| D5 | 3 |
| D6 | 3 |
| D7 | 4 |
| D8 | 5 |
| D9 | 6 |
| D10 | 7 |

FIG. 12
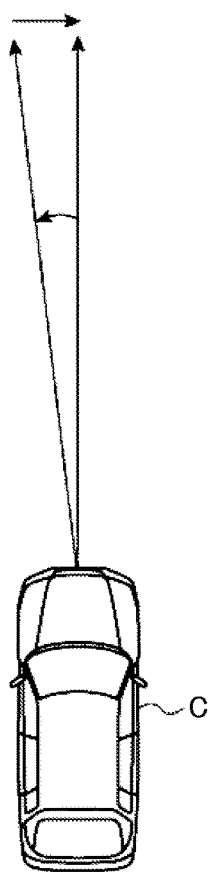
(a)
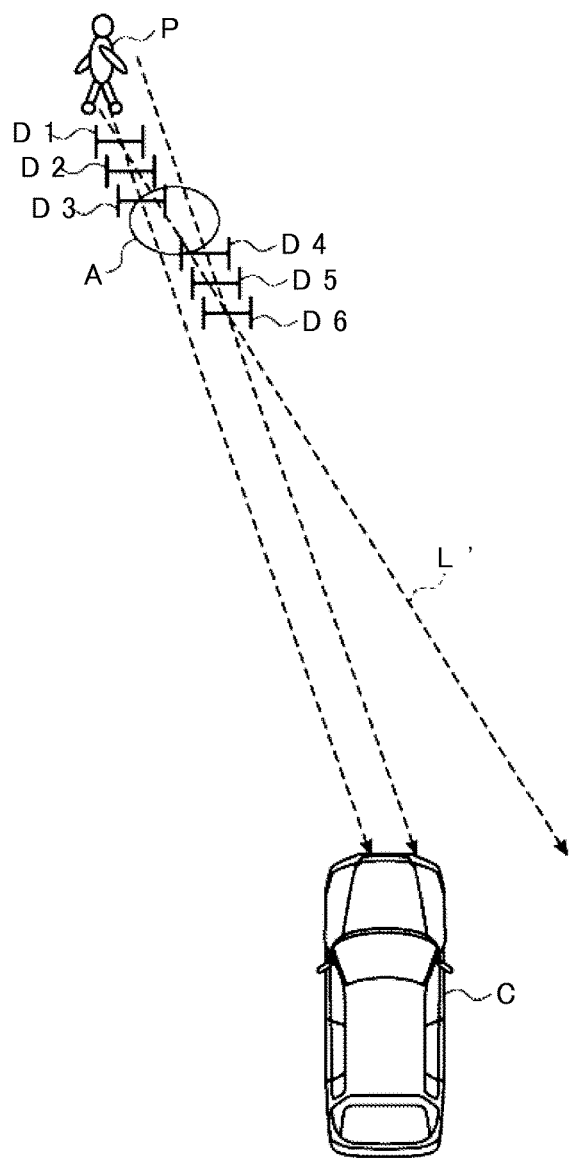
(b)

MOVEMENT TRAJECTORY PREDICTING DEVICE AND MOVEMENT TRAJECTORY PREDICTING METHOD

TECHNICAL FIELD

The invention relates to a movement trajectory predicting device that is mounted on a vehicle and predicts the movement trajectory of an object around the vehicle and a movement trajectory predicting method.

BACKGROUND ART

In a case where collision determination or the like is performed between a vehicle and an object around the vehicle (such as a pedestrian and another vehicle), the movement trajectory of the object with respect to the traveling vehicle needs to be accurately predicted. In the device that is illustrated in PTL 1, the path of a moving body is predicted from the position and the movement speed of the moving body present around the vehicle, the path of the vehicle is predicted from the position and the movement speed of the vehicle, and the possibility of a collision between the moving body and the vehicle is determined based on the path of the moving body and the path of the vehicle. In a case where the collision is likely, an alarm is given.

CITATION LIST

Patent Literature

PTL 1: Japanese Patent Application Publication No. 2003-81037

SUMMARY OF THE INVENTION

The vehicle may be shaken or deflect while traveling. When the vehicle C deflects in the counterclockwise direction as illustrated in FIG. 12(*a*), the object appears to move laterally rightward (direction opposite to the direction of deflection) in front of the vehicle C. In a case where the vehicle deflects by 1 deg, for example, the object appears to move 50 cm in the lateral direction in front of the vehicle C by 30 m.

In PTL 1, the movement trajectory is predicted from the position and the movement speed of the object (moving body). However, the relative movement trajectory with respect to the vehicle may also be predicted from the history of the apparent detected positions of the object (relative detected positions with respect to the vehicle). In a case where the movement trajectory is predicted by this method, a lateral position jump may occur in the history of the detected positions of the object and the accuracy of the prediction of the movement trajectory may be reduced when the vehicle is subjected to the shaking or deflection. In the case of the example that is illustrated in FIG. 12(*b*), for example, the pedestrian W walks rightward in front of the vehicle C and the history of the detected positions of the pedestrian P is D1 to D6. In this example, the counterclockwise deflection of the vehicle C results in the lateral position jump of the detected position in the place A that is illustrated by the elliptical shape and the position jumps rightward between the detected position D3 and the detected position D4. Accordingly, the movement trajectory illustrated by sign L' is obtained when the movement trajectory of the pedestrian P is predicted from the history of the detected positions D1 to D6 including the lateral position jump. This movement trajectory L' is predicted while being affected by a lateral position jump component not associated with the movement of the pedestrian P, and thus is different than the actual movement trajectory of the pedestrian P. The movement trajectory prediction accuracy regarding the object may be reduced as described above when the shaking or deflection of the vehicle occurs.

An object of the invention is to provide a movement trajectory predicting device and a movement trajectory predicting method with which the movement trajectory of an object can be accurately predicted from the history of the positions of the object even in the event of shaking or deflection of a vehicle.

According to an aspect of the invention, there is provided a movement trajectory predicting device predicting a movement trajectory of an object around a vehicle, the device including an object detection unit that acquires a position of the object around the vehicle, a speed acquisition unit that acquires a ground speed of the object, a relative movement vector calculation unit that calculates a relative movement vector of the object with respect to the vehicle by using speed information on the vehicle and the ground speed of the object acquired by the speed acquisition unit, a classification unit that records positions in the movement trajectory of the object acquired by the object detection unit and that classifies the recorded positions into a plurality of groups based on the relative movement vector calculated by the relative movement vector calculation unit, and a movement trajectory prediction unit that predicts the movement trajectory of the object based on a plurality of positions of the object included in at least one of the groups classified by the classification unit.

In the movement trajectory predicting device, the object detection unit detects the object and acquires the position of the object (relative position with respect to the vehicle). A predetermined number of the positions from the present to the past acquired for the respective objects (history of the positions of the object) are used in the prediction of a future movement trajectory of the object. Accordingly, the position of the object acquired by the object detection unit is recorded. In the movement trajectory predicting device, the speed acquisition unit acquires the ground speed of the object and the relative movement vector calculation unit calculates the relative movement vector of the object with respect to the vehicle by using the ground speed of the object and the speed information on the vehicle. The relative movement vector is a vector that shows the movement direction of the future movement trajectory of the object. In addition, the relative movement vector is calculated by the use of the ground speed instead of the relative speed with respect to the vehicle as the speed of the object, and thus is a vector that is not affected by the occurrence of a lateral position jump regarding the relative position of the object attributable to the shaking or deflection of the vehicle. In the movement trajectory predicting device, the classification unit classifies the recorded positions of the object (history of the positions of the object) into the plurality of groups based on the relative movement vector. Since the classification is performed with the relative movement vector as a reference, the positions of the object can be classified with the lateral position-jumped position excluded even in a case where the lateral position-jumped position is included in the recorded positions of the object. For example, the positions are classified into a group of the plurality of positions of the object following the lateral position jump and a group of the plurality of positions of the object preceding the lateral position jump. In the movement trajectory predicting device, the movement trajectory prediction unit predicts the movement trajectory of the object based on the plurality of positions of the object included in at least one of the classified groups. In this manner, the movement trajectory predicting device classifies the history of the positions of the object by using the relative movement vector based on the ground speed of the object and predicts the movement trajectory of the object, and thus can accurately predict the movement trajectory of the object from the history of the positions of the object even in a case where the lateral position jump occurs in the history of the positions of the object due to the shaking or deflection of the vehicle.

In the movement trajectory predicting device according to the invention, it is preferable that the object detection unit performs detection of the object by edge processing with respect to an image captured by a camera and the classification unit promotes use of a position as the position of the object as the position has a higher vertical edge intensity in the image regarding the classification of the recorded positions of the object.

The object detection unit of the movement trajectory predicting device performs the detection of the object by the edge processing with respect to the image captured by the camera. In a case where the shape of the object changes during a movement as in the case of a pedestrian, the detection range of the object changes and the central position of the detection range varies. When the central position is used as the detected position of the object, each position included in the history of the positions of the object used in the prediction of the movement trajectory varies. As a result, the accuracy of the prediction of the movement trajectory is reduced. The classification unit promotes the use of a position as the position of the object as the position has a higher vertical edge intensity in the image in the classification. The high-vertical edge intensity position in the range where the object is detected from the image is a place where the object has a high level of presence in the lateral direction in the detected range (place where the ratio of presence is higher than in the other places). Accordingly, this is suitable as the position of the object. As described above, the movement trajectory predicting device promotes the use of a position with a higher vertical edge intensity as the position of the object, and thus can suppress the variations in the history of the positions of the object and accurately predict the movement trajectory of the object.

In the movement trajectory predicting device according to the invention, it is preferable that the classification by the classification unit is not performed in a case where a steering amount of the vehicle is equal to or greater than a predetermined amount.

In a case where the vehicle is subjected to at least certain additional steering or cutback, the vehicle turns due to the additional steering or the cutback and the traveling direction changes. Accordingly, the relative position of the object changes in response thereto. In this case, the apparent shape of the object may change and the accuracy of the detection of the ground speed of the object may also be reduced. In this regard, in the movement trajectory predicting device, the classification unit does not perform the classification in a case where the steering amount of the vehicle is equal to or greater than the predetermined amount. A steering amount for the determination of the steering of the vehicle that is clearly different than the shaking or deflection of the vehicle is set as this predetermined amount.

In the movement trajectory predicting device according to the invention, it is preferable that the classification unit performs the classification while increasing a weight for the position among the recorded positions of the object as the position becomes closer in time to the present.

In a case where the object changes the movement direction or the speed, it is desirable that a position of the object after the change in the movement direction or the speed by the object is reflected to the prediction of the future movement trajectory of the object. Accordingly, it is desirable that a greater emphasis is put on the position closer to that of the present among the recorded positions of the object (the history of the positions of the object) during the prediction of the future movement trajectory of the object. In this regard, the classification unit performs the classification by increasing the weight for a position among the recorded positions of the object as the position becomes closer in time to the present. In this manner, the tendency of predicting the movement trajectory by the use of the group including the position closer in time to the present increases, and the information on the position closer to the present becomes more likely to be reflected to the predicted movement trajectory. Since the movement trajectory predicting device performs the classification by increasing the weight for a position among the recorded positions of the object in the history as the position becomes closer in time to the present as described above, the movement trajectory of the object can be more accurately predicted.

In the movement trajectory predicting device according to the invention, it is preferable that the relative movement vector calculation unit does not use the ground speed of the object that has a difference from a previous value of the ground speed equal to or greater than a first threshold and has a difference from a speed obtained from a difference between the positions of the object equal to or greater than a second threshold in calculating the relative movement vector.

In a case where the ground speed of the object is an abnormal value (falsely detected value), the relative movement vector becomes a vector showing a wrong movement direction and the movement trajectory prediction accuracy is reduced. In this regard, it is determined whether or not the ground speed of the object is an outlier that significantly differs from the previous value. Even in a case where the ground speed is the outlier differing from the previous value, the ground speed may be a value subjected to a sudden change due to a sudden acceleration or a sudden deceleration of the object in that case. In this regard, the movement speed pertaining to that case is obtained from the difference between the previous and later positions of the object and it is determined whether or not the ground speed of the object that significantly differs from the obtained movement speed. The two determinations allow the determination of the presence or absence of the abnormal value in the ground speed of the object. The relative movement vector calculation unit does not use the ground speed of the object that has a difference from the previous value of the ground speed equal to or greater than the first threshold and has a difference from the speed obtained from the difference between the positions of the object equal to or greater than the second threshold in calculating the relative movement vector. The first threshold is a threshold that is used in determining whether or not the ground speed of the object is the outlier differing from the previous value. The second threshold is a threshold that is used in determining whether or not the ground speed of the object is a value differing from the speed that is obtained from the difference between the detected positions of the object. As described above, the movement trajectory predicting device does not use the ground speed of the object in calculating the relative movement vector in a case where the ground speed of the object is the abnormal value, and thus can suppress a decline in the accuracy of the relative movement vector and can suppress a decline in the movement trajectory prediction accuracy.

According to another aspect of the invention, there is provided a movement trajectory predicting method for predicting a movement trajectory of an object around a vehicle, the method including an object detecting step for acquiring a position of the object around the vehicle, a speed acquiring step for acquiring a ground speed of the object, a relative movement vector calculating step for calculating a relative movement vector of the object with respect to the vehicle by using speed information on the vehicle and the ground speed of the object acquired in the speed acquiring step, a classifying step for recording positions in the movement trajectory of the object acquired in the object detecting step and classifying the recorded positions into a plurality of groups based on the relative movement vector calculated in the relative movement vector calculating step, and a movement trajectory predicting step for predicting the movement trajectory of the object based on a plurality of positions of the object included in at least one of the groups classified in the classifying step. This movement trajectory predicting method acts similarly to the movement trajectory predicting device described above and achieves an effect similar to that of the movement trajectory predicting device described above.

According to the invention, the history of the positions of the object is classified by the use of the relative movement vector based on the ground speed of the object in predicting the movement trajectory of the object, and thus the movement trajectory of the object can be accurately predicted from the history of the positions of the object even in a case where the lateral position jump occurs in the history of the positions of the object due to the shaking or deflection of the vehicle.

BRIEF DESCRIPTION OF THE DRAWINGS

FIG. 4 is an explanatory drawing of the detected positions of the object used for the fitting, FIG. 4(a) showing a case where a pedestrian swings his or her arm greatly and a case where the pedestrian swings his or her arm little and FIG. 4(b) showing the lateral-width central position of the detected object and the position with the maximum vertical edge.

FIG. 8 is an example of weights of the respective detected positions of the object used in the system ECU that is illustrated in FIG. 1.

FIG. 12 is an example of a case where a subject vehicle deflects, FIG. 12(a) being a diagram illustrating an apparent forward lateral movement pertaining to a case where the subject vehicle deflects and FIG. 12(b) being a diagram illustrating the pedestrian's detected position and movement trajectory preceding and following the deflection of the subject vehicle.

MODES FOR CARRYING OUT THE INVENTION

Figure 1:
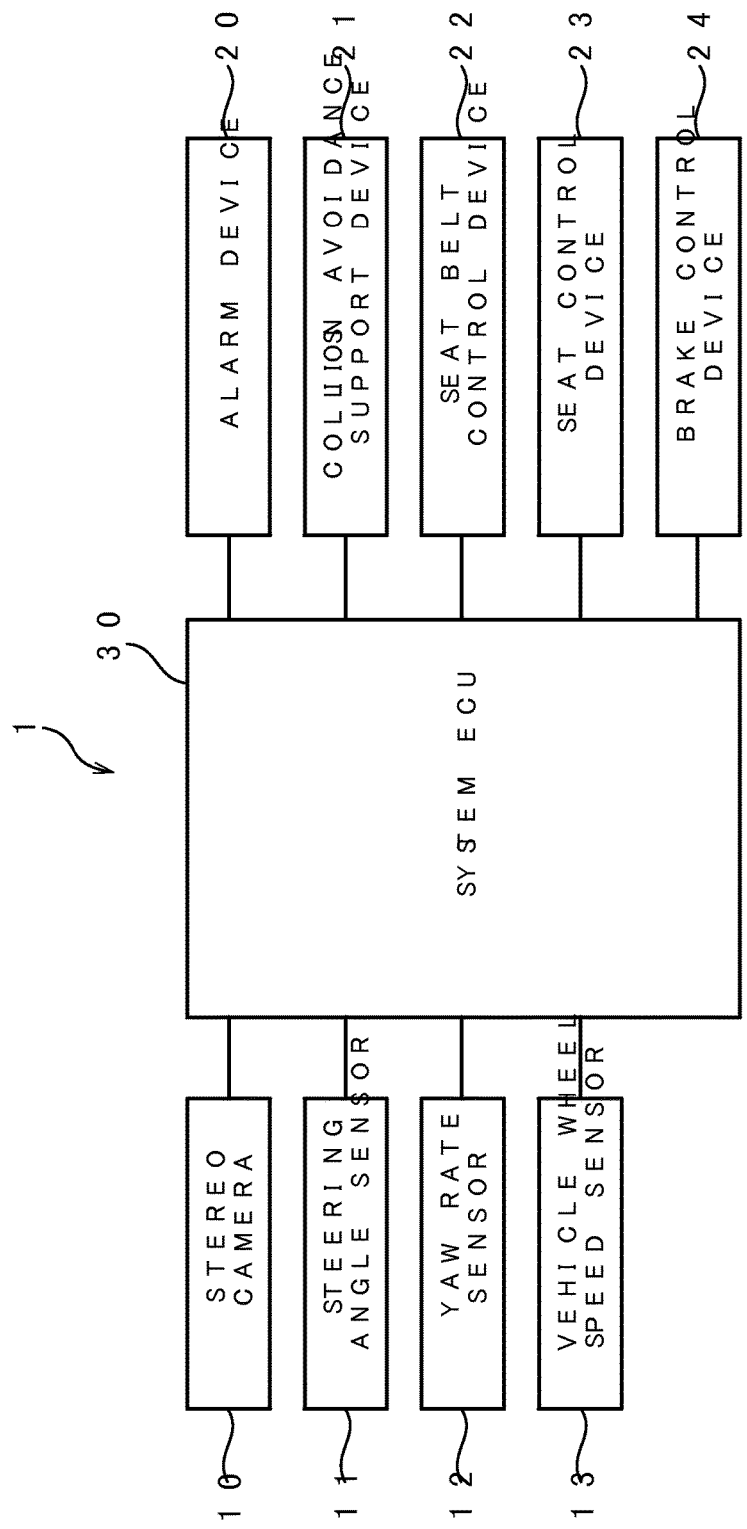
FIG. 1 is a configuration diagram of a collision prediction device according to this embodiment.

Hereinafter, an embodiment of a movement trajectory predicting device and a movement trajectory predicting method according to the invention will be described with reference to accompanying drawings. In the drawings, the same reference numerals will be used to refer to the same or corresponding elements and description thereof will be omitted.

In this embodiment, movement trajectory prediction according to the invention is applied to a movement trajectory prediction function regarding an object that a vehicle-mounted collision prediction device has. The collision prediction device according to this embodiment detects an object around (in front of, in particular) a subject vehicle with a stereo camera and predicts a movement trajectory from the history of relative detected positions of the detected object. The collision prediction device according to this embodiment performs an object-subject vehicle collision determination by using the predicted movement trajectory of the object. The collision prediction device according to this embodiment performs support for collision avoidance and collision damage reduction in a case where the collision is likely to occur.

The object includes a moving object and a stationary object. Examples of the moving object include a pedestrian, a bicycle, and a vehicle. Examples of the stationary object include a utility pole and a traffic sign. Any number of detected positions for a period between the present and the past form the history of the detected positions of the object that is used in the prediction of the movement trajectory. The number may be set by adaptation in view of a detected position update cycle or the like.

Figure 2:
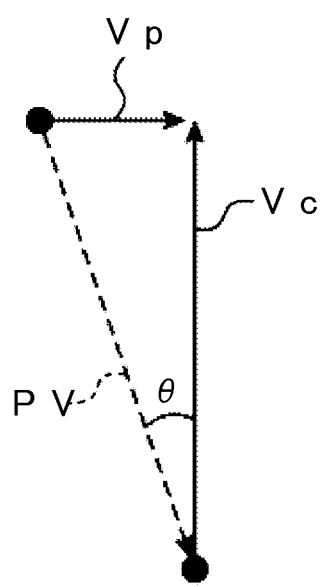
FIG. 2 is an explanatory drawing of a trajectory prediction vector.
Figure 3:
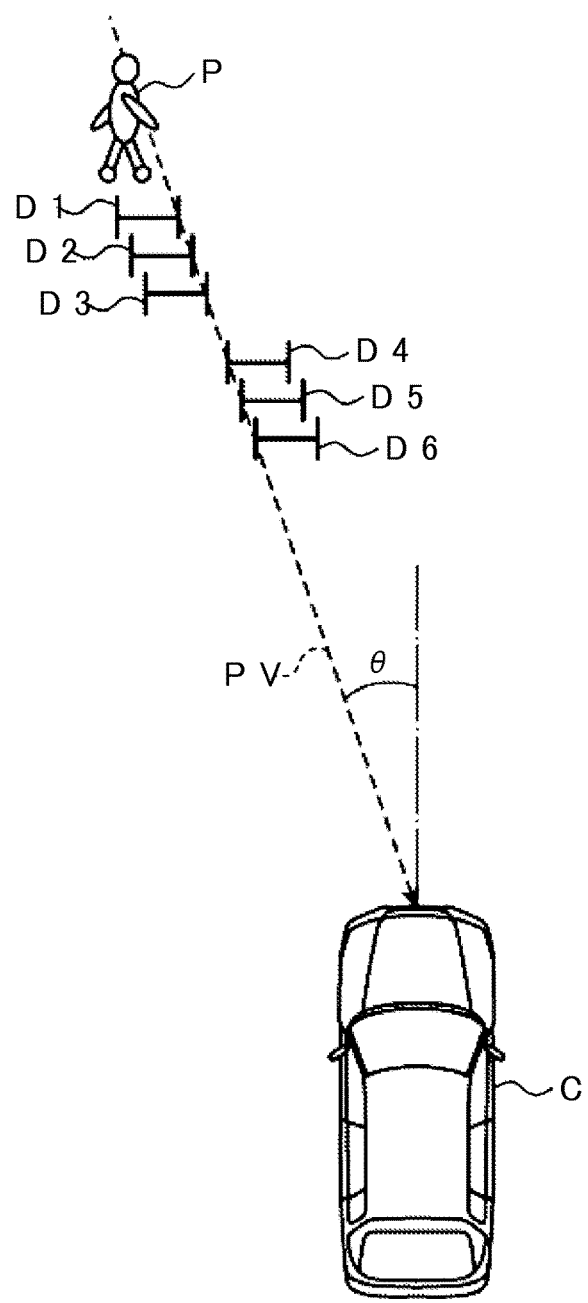
FIG. 3 is an explanatory drawing of fitting with respect to the history of detected positions of an object using the slope of the trajectory prediction vector.
Figure 5:
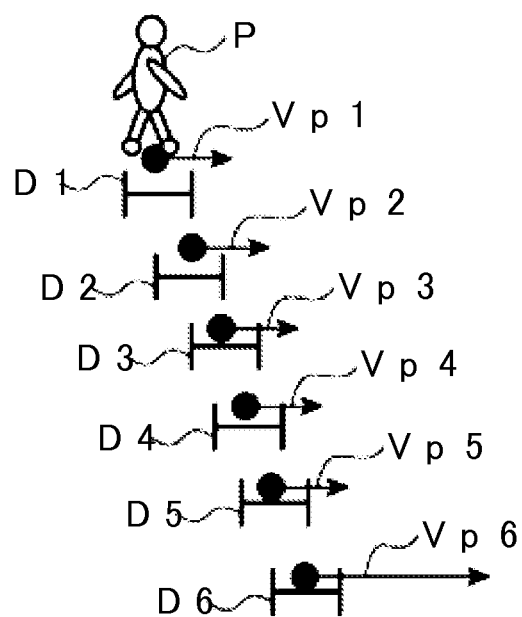
FIG. 5 is an explanatory drawing regarding the removal of an abnormal value of the ground speed of the object.
Figure 6:
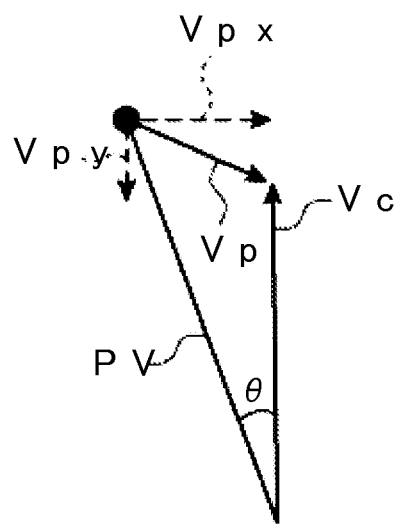
FIG. 6 is an explanatory drawing of trajectory prediction vector calculation processing in the system ECU that is illustrated in FIG. 1.
Figure 7:
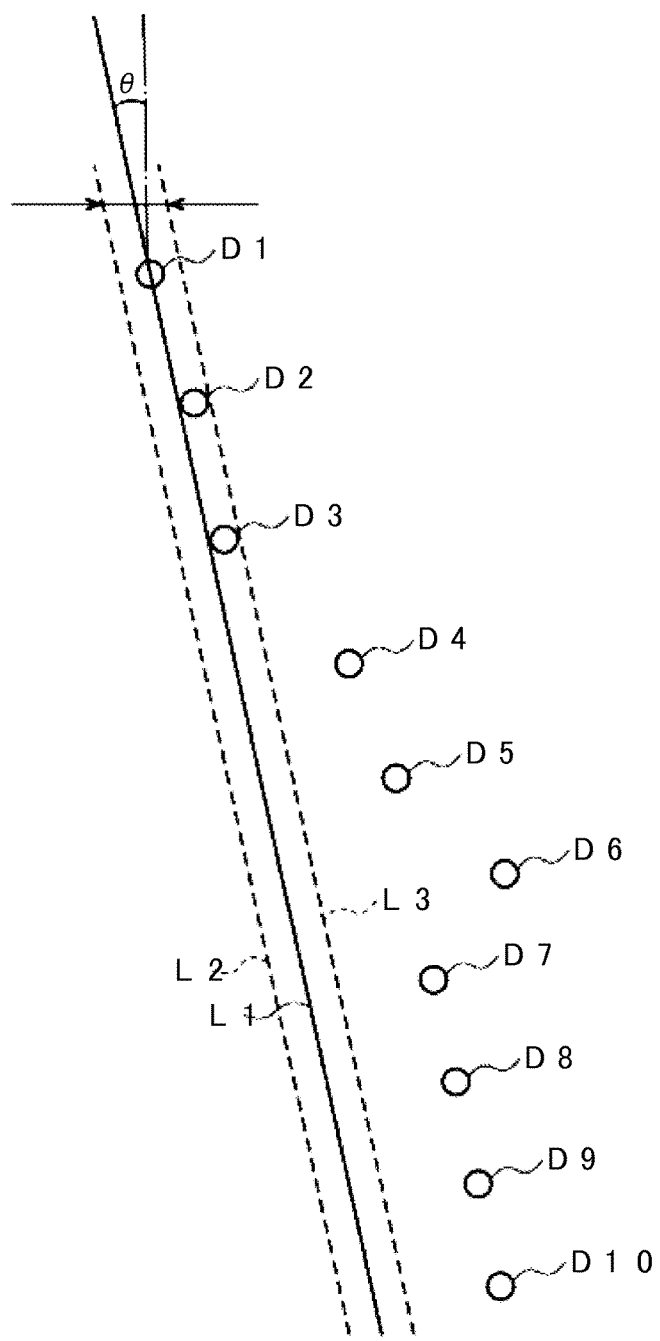
FIG. 7 is an explanatory drawing of fitting processing in the system ECU that is illustrated in FIG. 1.

A collision prediction device 1 according to this embodiment will be described with reference to FIGS. 1 to 8. FIG. 1 is a configuration diagram of the collision prediction device according to this embodiment. FIG. 2 is an explanatory drawing of a trajectory prediction vector. FIG. 3 is an explanatory drawing of fitting with respect to the history of the detected positions of the object using the slope of the trajectory prediction vector. FIG. 4 is an explanatory drawing of the detected positions of the object used for the fitting. FIG. 5 is an explanatory drawing regarding the removal of an abnormal value of the ground speed of the object. FIG. 6 is an explanatory drawing of trajectory prediction vector calculation processing in a system ECU. FIG. 7 is an explanatory drawing of fitting processing in the system ECU. FIG. 8 is an example of weights of the respective detected positions of the object used in the system ECU.

In order to accurately predict the movement trajectory of the object even in a case where the subject vehicle is shaken or deflects, the collision prediction device 1 obtains a relative movement vector of the object with respect to the subject vehicle (this vector will be referred to as a "trajectory prediction vector") by using the ground speed of the object and the vehicle speed of the subject vehicle and predicts the movement trajectory of the object by fitting the straight line having the slope (movement direction of the object) of the trajectory prediction vector with respect to the history of the detected positions of the object (detected positions in the recorded movement trajectory of the object). During the execution of the fitting, a high-vertical edge intensity position is used as the detected position of the object and later detected positions in the history of the detected positions of the object have greater weights. In addition, the abnormal value is removed with respect to the ground speed of the object. In addition, the movement trajectory of the object is predicted by a known method in a case where a steering amount of the subject vehicle is large (in a case where the subject vehicle does not travel straight).

The ground speed of the object will be described before the configuration of the collision prediction device 1 is described in detail. In a case where a relative speed with respect to the subject vehicle is used as the speed of the object, a variation caused by a lateral position jump attributable to the shaking or deflection of the subject vehicle is included in the relative speed when the shaking or deflection of the subject vehicle occurs. Accordingly, the ground speed (absolute speed) is used as the speed of the object so that the speed is not affected by the lateral position jump attributable to the shaking or deflection of the subject vehicle. The ground speed can be acquired based on, for example, detection from the difference between the positions of a fixed object and the object detected by an external sensor, reception of a speed detected by the object based on communication with the object, or road-to-vehicle communication-based on reception of the speed of the object detected by roadside infrastructure. Only the latest ground speed may be used as the ground speed for obtaining the trajectory prediction vector or the average of a plurality of present and past ground speeds may be used as the ground speed for obtaining the trajectory prediction vector.

The trajectory prediction vector (slope, in particular) will be described with reference to FIG. 2. The trajectory prediction vector PV is obtained as a relative vector between the vehicle speed Vc of the subject vehicle and the ground speed Vp of the object. The slope θ of the trajectory prediction vector PV is obtained as the slope (angle) of the movement of the object with respect to the traveling direction of the subject vehicle (basically, straight-driving direction). In a case where the depth-direction speed of the object is negligible with respect to the vehicle speed of the subject vehicle (examples of which include a case where the object is the pedestrian walking in a lateral direction in front of the subject vehicle), the trajectory prediction vector PV may be obtained by using solely a lateral-direction speed component for the ground speed Vp of the object. When the traveling direction of the subject vehicle (angle with respect to the straight-driving direction) can be obtained, the trajectory prediction vector PV and the slope θ may be obtained in view of the traveling direction. However, this consideration may be unnecessary because the straight driving of the subject vehicle is regarded as a typical support target. Accordingly, the trajectory prediction vector PV and the slope θ may be obtained from the lateral-direction ground speed of the object and the vehicle speed of the subject vehicle as the minimum required information.

The trajectory prediction vector PV is a vector that shows a movement direction regarding a future movement trajectory of the object. Accordingly, the slope θ of the trajectory prediction vector PV shows the movement direction regarding the future movement trajectory of the object with respect to the traveling direction of the subject vehicle. The trajectory prediction vector PV is calculated by the use of the ground speed, instead of the relative speed with respect to the subject vehicle, as the speed of the object. Accordingly, the trajectory prediction vector PV is a vector that is not affected by the occurrence of the lateral position jump regarding the relative position of the object attributable to the shaking or deflection of the subject vehicle.

Hereinafter, the fitting using the slope θ of the trajectory prediction vector PV will be described with reference to FIG. 3. During the fitting, the straight line having the slope θ is subjected to fitting to each of the detected positions included in the history of the detected positions of the object and which position this straight line fits the best to (is the most appropriate for) is determined. During the fitting, the detected positions preceding or following the lateral position jump are excluded in detected position classification especially in a case where the lateral position jump occurs due to the shaking or deflection of the subject vehicle. Examples of methods for the fitting include a majority decision method based on the voted detected positions within a range centering on a straight line in which each of the detected positions is a reference and a least squares method.

In the example that is illustrated in FIG. 3, the fitting is performed by the use of the slope θ of the trajectory prediction vector PV with respect to the six detected positions D1 to D6 of the pedestrian P as the object and the lateral position jump occurs between the detected position D3 and the detected position D4 due to the deflection of the subject vehicle C. In a case where the fitting is performed with the straight line having the slope θ and with respect to the detected position D3, for example, the detected positions D4, D5, D6 after the lateral position jump are excluded and classification is made into the group of detected positions D1, D2, D3. In a case where the fitting is performed with the straight line having the slope θ and with respect to the detected position D6, the detected positions D1, D2, D3 before the lateral position jump are excluded and classification is made into the group of detected positions D4, D5, D6. Then, the group that has the straight line which fits the best to the straight line having the slope θ is determined with regard to the groups pertaining to the respective detected positions classified as described above. In FIG. 3 and the like, the marks that are substantially H-shaped and show the detected positions D1 . . . also show a detected range (lateral width) by the lateral-direction length.

The object moves at a constant speed in a constant movement direction in some cases but changes the movement direction or the speed in the other cases. In a case where the object changes the movement direction or the speed, it is desirable that a detected position after the change in the movement direction or the speed by the object is reflected to the prediction of the future movement trajectory of the object. Accordingly, it is desirable that a greater emphasis is put on the detected position closer to that of the present in the history of the detected positions of the object during the prediction of the future movement trajectory of the object. In this regard, the detected position closer in time to that of the present (latest detected position) in the history of the detected positions of the object has greater weight in a case where the fitting is performed. In the case of the majority decision-based fitting method, for example, vote is employed with the detected positions weighted. In the case of the fitting method based on the least squares method, a method of weighted least squares is employed.

Hereinafter, a reason that the high-vertical edge intensity position is used as the detected position of the object will be described with reference to FIG. 4. In a case where the object is an object changing in shape while moving, such as the pedestrian, the detected range of the object changes and the central position of the detected range varies. In the case of the pedestrian P crossing in front of the subject vehicle as illustrated in FIG. 4(a), for example, the lateral width (detected range) W1 of the pedestrian P pertaining to a case where the pedestrian P swings his or her arm to the front and to the back differs from the lateral width (detected range) W2 of the pedestrian P pertaining to a case where the pedestrian P does not swing his or her arm to the front and to the back. Accordingly, the central position is around the front end of the body of the pedestrian P in the case of the lateral width W1 and the central position is around the center of the body of the pedestrian P in the case of the lateral width W2. Accordingly, the central positions P1, P2 . . . of the lateral width of the pedestrian P illustrated by the black triangle marks vary as illustrated in FIG. 4(b). When the central positions of the lateral width (or end portions of the lateral width) are used as the detected positions of the object, the fitting and the prediction of the movement trajectory are performed with a history of varying detected positions. As a result, accurate fitting cannot be performed and the accuracy of the prediction of the movement trajectory is reduced.

In a case where the object is detected from an image by edge processing, the high-vertical edge intensity position in the range where the object is detected from the image is a place where the object has a high level of presence in the lateral direction in the detected range (place where the ratio of presence is higher than in the other places). Accordingly, this is suitable as the position of the object. In a case where the detected position of the object is used in the fitting or the like, the position with the highest vertical edge intensity in the detected range of the object (lateral width, in particular) is used as the detected position of the object. In the case of the example that is illustrated in FIG. 4(a), the position E1 with the highest vertical edge intensity of the pedestrian P pertaining to a case where the arm is swung to the front and to the back is around the center of the body of the pedestrian P and the position E2 with the highest vertical edge intensity of the pedestrian P pertaining to a case where the arm is not swung to the front and to the back is also around the center of the body of the pedestrian P. In addition, the positions E1, E2 . . . with the highest vertical edge intensity of the pedestrian P illustrated by the white circle marks do not vary as illustrated in FIG. 4(b). Coping with this detected position is not applied in a case where the edge processing is not used in the detection of the object.

Hereinafter, the removal of the abnormal value of the ground speed of the object will be described with reference to FIG. 5. In a case where the ground speed of the object is the abnormal value (falsely detected value), the trajectory prediction vector PV that is obtained from the ground speed becomes an error-including vector and the fitting is performed by the use of an error-including slope θ. In a case where the ground speed of the object is an outlier that significantly differs from the previous value, the ground speed may be the abnormal value. Even in a case where the ground speed is the outlier differing from the previous value, however, the ground speed may be a value subjected to a sudden change due to an actual sudden acceleration or an actual sudden deceleration of the object in that case. In a case where the ground speed of the object is the outlier differing from the previous value and significantly differs from the movement speed which is obtained from the difference between the detected positions of the object, the ground speed of the object is determined to be the abnormal value and is not used in the calculation of the trajectory prediction vector. In the case of the example that is illustrated in FIG. 5, for example, the ground speed Vp6 among the ground speed Vp1, Vp2 . . . of the pedestrian P is the outlier differing from the previous value Vp5 and the current value D6 of the detected position of the pedestrian P is not significantly changed from the previous value D5 (the current value D6 and the previous value D5 do not significantly differ from each other). Accordingly, the ground speed Vp6 is determined to be the abnormal value and is not used.

Coping pertaining to a case where the ground speed is determined as the abnormal value will be described. In a case where, for example, only the latest ground speed is used in obtaining the trajectory prediction vector PV, the previous value of the ground speed or the speed that is obtained from the difference between the current value of the detected position of the object and the previous value is used. In a case where the average value of any number of past ground speeds are used in obtaining the trajectory prediction vector PV, the average value of the ground speed is calculated without the use of the latest ground speed.

Hereinafter, a case where a steering amount of the subject vehicle is large (case where the subject vehicle does not travel straight) will be described. In a case where the subject vehicle is subjected to at least certain additional steering or cutback, the subject vehicle turns due to the additional steering or the cutback and the traveling direction changes. Accordingly, the relative detected position of the object significantly changes in response thereto. In this case, the apparent shape of the object may change and the accuracy of the detection of the ground speed of the object may also be reduced. In this regard, the calculation and fitting of the trajectory prediction vector PV (slope θ, in particular) are not performed in a case where the steering amount of the subject vehicle is equal to or greater than a predetermined amount. Then, the future movement trajectory of the object is predicted by a method according to the related art and by the use of every detected position in the history of the detected positions of the object. Examples of the method according to the related art regarding the prediction of the movement trajectory include the use of the difference between the detected positions included in the history of the detected positions and performing linear regression on the history of the detected positions.

Hereinafter, a specific configuration of the collision prediction device 1 will be described. The collision prediction device 1 is provided with a stereo camera 10, a steering angle sensor 11, a yaw rate sensor 12, a vehicle wheel speed sensor 13, an alarm device 20, a collision avoidance support device 21, a seat belt control device 22, a seat control device 23, a brake control device 24, and a system electronic control unit (ECU) 30. In this embodiment, the stereo camera 10 corresponds to the object detection unit according to the claims, processing by the stereo camera 10 and the system ECU 30 corresponds to the speed acquisition unit according to the claims, and respective processing by the system ECU 30 corresponds to the relative movement vector calculation unit, the classification unit, and the movement trajectory prediction unit according to the claims.

A pair of right and left cameras that image the area in front of the subject vehicle and an image processing device constitute the stereo camera 10. Each of the pair of right and left cameras of the stereo camera 10 performs imaging at regular time intervals (for example, every 1/30 seconds) and acquires a right image and a left image. The image processing device of the stereo camera 10 performs object detection processing by using the right and left images (stereo images) and acquires information on the object in a case where the object (target) can be detected. Examples of the information on the object include the relative distance in the depth direction from the stereo camera 10 (subject vehicle) to the object, the lateral position in the lateral direction, the lateral width and height of the object, and the shape of the object. A known technique according to the related art is applied as a method for detecting the object by using the stereo images, examples of which include a detection method in which a correlated calculation is performed between the stereo images for the use of the parallax obtained from the result of the correlated calculation and a detection method based on edge processing (vertical edge, lateral edge) of the images. The stereo camera 10 transmits information on the presence or absence of the object or the like to the system ECU 30 as a stereo camera signal at regular time intervals. In a case where the objects can be detected, the stereo camera 10 transmits information on each object (on each target) or the like to the system ECU 30 as the stereo camera signal at regular time intervals. In a case where the edge processing is performed, information on vertical edge intensity and lateral edge intensity within a range detected for each object is also transmitted.

The target object that is detected by the stereo camera 10 is a target object that has a certain size and a certain height such as the pedestrian, the bicycle, the vehicle, the utility pole, and the traffic sign described above. The image processing in the stereo camera 10 is performed in a coordinate system on a pixel basis regarding the horizontal direction/vertical direction of the images captured by the cameras and the object information is data on a pixel basis. An identification number is given to the detected target. In a case where the same target is detected at different times, the same identification number is given and the number of detections is counted. The information on the identification number and the number of detections is also transmitted as the target-specific information and the stereo camera signal.

The steering angle sensor 11 is a sensor that detects a steering angle which is input to a steering wheel by a driver. The steering angle sensor 11 detects the steering angle at regular time intervals and transmits the detected steering angle as a steering angle signal to the system ECU 30.

The yaw rate sensor 12 is a sensor that detects the yaw rate which acts on the subject vehicle. The yaw rate sensor 12 detects the yaw rate at regular time intervals and transmits the detected yaw rate as a yaw rate signal to the system ECU 30.

The vehicle wheel speed sensor 13, which is disposed in each of the four wheels of the vehicle, is a sensor that detects the rotation speed of the vehicle wheel (pulse number resulting from the rotation of the vehicle wheel). The vehicle wheel speed sensor 13 detects the rotation pulse number of the vehicle wheel at regular time intervals and transmits the detected vehicle wheel rotation pulse number as a vehicle wheel speed signal to the system ECU 30. The system ECU 30 calculates the vehicle wheel speed from each vehicle wheel rotation pulse number and calculates the vehicle body speed (vehicle speed) from the vehicle wheel speed of each wheel.

The alarm device 20 is a device that gives an alarm to the driver of the subject vehicle. Examples of the alarm include a buzzer (alarm sound) output, an audio-based alarm message output, and display. The alarm device 20 outputs the alarm based on an alarm control signal when the alarm control signal is received from the system ECU 30.

The collision avoidance support device 21 is a device for collision avoidance and collision impact mitigation based on steering control (automatic steering, steering assist, and the like). The collision avoidance support device 21 performs the steering control based on a collision avoidance control signal when the collision avoidance control signal is received from the system ECU 30.

The seat belt control device 22 is a device for collision damage reduction based on the control of a seat belt clamping force. The seat belt control device 22 controls the seat belt clamping force based on a seat belt control signal when the seat belt control signal is received from the system ECU 30.

The seat control device 23 is a device for collision damage reduction based on the control of the position and posture of a seat. The seat control device 23 controls the position and posture of the seat based on a seat control signal when the seat control signal is received from the system ECU 30.

The brake control device 24 is a device for collision avoidance and collision impact mitigation based on brake control (automatic stop, automatic deceleration, brake assist, and the like). The brake control device 24 performs the brake control based on a brake control signal when the brake control signal is received from the system ECU 30.

The system ECU 30 is an electronic control unit that performs an overall control of the collision prediction device 1. A central processing unit (CPU), a read-only memory (ROM), a random access memory (RAM), and the like constitute the system ECU 30. The system ECU 30 receives the stereo camera signal from the stereo camera 10 at regular time intervals. In addition, the system ECU 30 receives a detection signal from each of the sensors 11, 12, 13. The system ECU 30 performs each processing (subject vehicle trajectory prediction processing, ground speed detection processing, steering determination processing, object trajectory prediction processing during steering, abnormal value removal processing, trajectory prediction vector calculation processing, fitting processing, object trajectory prediction processing for straight driving, collision position prediction processing, collision probability integration processing, collision determination processing, and device control processing) by using the stereo camera signal and each of the detection signals to load a ROM-stored application program onto the RAM and executing the application program with the CPU. In a case where the subject vehicle is likely to collide with the object, the system ECU 30 transmits a control signal to the device required for collision avoidance or collision damage reduction. The trajectory prediction vector calculation processing by the system ECU 30 corresponds to the relative movement vector calculation unit according to the claims, the fitting processing corresponds to the classification unit according to the claims, and the object prediction processing for straight driving corresponds to the movement trajectory prediction unit according to the claims. The ground speed detection processing by the stereo camera 10 and the system ECU 30 corresponds to the speed acquisition unit according to the claims.

In a case where the same target (object) is detected at least twice and continuously by the stereo camera 10, the system ECU 30 predicts the movement trajectory of the object and performs the object-subject vehicle collision determination. In a case where the targets (objects) are detected by the stereo camera 10, a sufficient number of pieces of positional information required for the prediction or the like are held (recorded) in the RAM for each object by the system ECU 30 for the prediction of the movement trajectory of the object. In addition, the system ECU 30 performs object-specific processing in a case where the targets (objects) are detected by the stereo camera 10. In addition, the system ECU 30 performs processing in a coordinate system on a lateral direction (x direction)/distance direction (y direction) length basis (for example, tens of centimeters basis or several centimeters basis) and converts the data of the image obtained from the stereo camera 10 on a pixel basis in the horizontal direction/vertical direction to data on a lateral direction/distance direction length basis. Processing in the coordinate system on a horizontal direction/vertical direction pixel basis regarding the image may be performed instead of the conversion. In a case where the amount of movement and speed of the object in the distance direction is negligible with respect to the amount of movement and speed of the subject vehicle in the distance direction, the system ECU 30 may use only the detected position and speed of a lateral-direction component in a case where the detected position and speed of the object are handled.

Hereinafter, the subject vehicle trajectory prediction processing will be described. The system ECU 30 predicts the future movement trajectory of the subject vehicle from the vehicle speed history, the yaw rate history, and the steering angle history of the subject vehicle. A known prediction method according to the related art is applied to a method for predicting the movement trajectory.

Hereinafter, the ground speed detection processing will be described. In a case where the object is detected by the stereo camera 10, the system ECU 30 calculates the difference between the current value of the detected position of the object and the position of the fixed object on a road (relative vector of the current value of the detected position pertaining to a case where the fixed object is a reference) and calculates the difference between the previous value of the detected position of the object and the position of the same fixed object on the road (relative vector of the previous value of the detected position pertaining to a case where the fixed object is the reference). Examples of the fixed object include a point at which the brightness gradient obtained by the edge processing of the image around the subject vehicle is high (such as the boundary of a white line drawn on the surface of the road and a road joint) and a roadside object (such as the utility pole and the traffic sign). The fixed objects are detected by the stereo camera 10. The system ECU 30 calculates the movement vector from the previous value of the detected position to the current value of the detected position by using the difference between the current value of the detected position and the position of the fixed object on the road (relative vector of the current value of the detected position) and the difference between the previous value of the detected position and the position of the fixed object on the road (relative vector of the previous value of the detected position). The magnitude of the movement vector is the amount of movement per step of update time and the direction of the movement vector is the movement direction per step of update time. The system ECU 30 calculates the ground speed of the object by dividing the amount of movement of the movement vector by the update time.

Hereinafter, the steering determination processing will be described. The system ECU 30 calculates the amount of change (steering amount) in the steering angle per predetermined time and determines whether or not the steering amount is equal to or greater than a steering threshold. The predetermined time is set in advance by adaptation and examples thereof include a step of update time. The steering threshold is a steering amount for the determination of the steering of the subject vehicle (in a case where the subject vehicle does not travel straight) that is clearly different than the shaking or deflection of the subject vehicle and is set in advance by adaptation. The system ECU 30 makes a transition to the object trajectory prediction processing during steering in a case where the steering amount is equal to or greater than the steering threshold (in a case where the subject vehicle does not travel straight) and makes a transition to the abnormal value removal processing in a case where the steering amount is less than the steering threshold (in a case where the subject vehicle travels straight).

Hereinafter, the object trajectory prediction processing during steering will be described. The system ECU 30 predicts the future movement trajectory of the object by a known prediction method according to the related art and by using the history of the detected positions of the object.

Hereinafter, the abnormal value removal processing (filtering processing) will be described. The system ECU 30 determines whether or not the ground speed of the object is detected only once in the ground speed detection processing. In a case where the ground speed is detected only once, the system ECU 30 uses the ground speed in the following processing. In a case where the ground speed is detected at least twice, the system ECU 30 determines whether or not the absolute value of the difference between the current value and the previous value of the ground speed is equal to or greater than a first threshold. The first threshold, which is set in advance by adaptation, is a threshold that is used in determining whether or not the ground speed of the object becomes the outlier differing from the previous value. In a case where the absolute value is determined to be equal to or greater than the first threshold (in a case where the current value of the ground speed is the outlier), the system ECU 30 calculates the speed by dividing the difference between the current value and the previous value of the detected position of the object by the update time and determines whether or not the absolute value of the difference between the speed and the current value of the ground speed is equal to or greater than a second threshold. The second threshold, which is set in advance by adaptation, is a threshold that is used in determining whether or not the ground speed of the object is a value differing from the speed that is obtained from the difference between the detected positions of the object. In a case where the absolute value is determined to be equal to or greater than the second threshold (in a case where the current value of the ground speed is a value differing from the speed based on the difference between the detected positions), the system ECU 30 does not use the current value of the ground speed as the ground speed in the following processing. In this case, the previous value of the ground speed or the like is used as the ground speed. In a case where the absolute value is less than the first threshold or in a case where the abnormal value is less than the second threshold in the respective determinations described above, the system ECU 30 uses the current value of the ground speed as the ground speed in the following processing. The first threshold and the second threshold may have the same value or may have different values.

Hereinafter, the trajectory prediction vector calculation processing will be described. As illustrated in FIG. 6, the system ECU 30 calculates the slope θ of the trajectory prediction vector PV by using the vehicle speed Vc of the subject vehicle and the ground speed Vp of the object (lateral-direction component (x-axis component): Vpx, distance direction component (y-axis component): Vpy). The calculation formula of θ=arctan(Vpx/(Vc+Vpy)) is used in this calculation. Herein, the slope θ of the trajectory prediction vector PV that is required for the fitting processing is directly calculated. However, the slope θ may also be calculated after the trajectory prediction vector PV is obtained. When the speed Vpy of the object in the distance direction is negligible with respect to the vehicle speed Vc of the subject vehicle, the calculation may be performed with the Vpy excluded. In addition, the directions of the unit and sign are converted if necessary.

Hereinafter, the fitting processing will be described. The majority decision method is used in the fitting processing. Herein, an example will be described in which the fitting is performed with respect to 10 points of the detected positions D1 to D10 as the history of the detected positions of the object as illustrated in FIGS. 7 and 8. Among the detected positions D1 to D10, the detected position D10 is the latest detected position and the detected position D1 is the earliest detected position. As illustrated in FIG. 8, a weight is set for each of the detected positions D1 to D10, the maximum weight of seven is set for the latest detected position D10, and lower values are set as the weights for the earlier detected positions. In this example, the subject vehicle deflects and the lateral position jump occurs between the detected position D3 and the detected position D4. The detected position D6 is an outlier attributable to sensor noise.

The system ECU 30 selects the detected position Di in order from the detected positions D1 to D10 that are held (recorded) in the RAM and performs the following processing with regard to all of the detected positions D1 to D10. The system ECU 30 calculates the straight line having the slope θ that passes through the detected position Di. Then, the system ECU 30 calculates each parallel line at a predetermined interval to both right and left sides from this straight line and sets a vote range formed by the right and left parallel lines. The predetermined interval is an interval with which the detected position of the lateral position jump can be excluded in a case where the lateral position jump occurs due to the shaking or deflection of the subject vehicle and is an interval with which the noise value (outlier) of the detected position during the object detection by the stereo camera 10 can be excluded. The predetermined interval is set in advance by adaptation. Then, the system ECU 30 extracts the detected position within the vote range among the detected positions D1 to D10. In addition, the system ECU 30 integrates the weights of the extracted detected positions and uses the integrated value as a vote point.

After the completion of the processing described above with regard to all of the detected positions D1 to D10, the system ECU 30 compares the vote points of all of the detected positions D1 to D10 to one another and selects the straight line of the detected position with the maximum vote points. In a case where the straight lines of a plurality of the detected positions are selected, the plurality of the straight lines that are selected are assumed to be substantially the same straight lines. However, the final straight line may be, for example, the straight line of the latest detected position or the average straight line of the straight lines of the plurality of detected positions that are selected.

FIG. 7 illustrates an example with respect to the detected position D1, in which the straight line L1 having the slope θ that passes through the detected position D1 and the parallel lines L2, L3 on both the right and left sides thereof are calculated and the vote range formed by the parallel line L2 and the parallel line L3 are set. The detected position D1, the detected position D2, and the detected position D3 are extracted as the detected positions within the vote range and four points are calculated as the vote points. In this example, the detected position D4, the detected position D5, the detected position D7, the detected position D8, the detected position D9, and the detected position D10 are extracted as the detected positions within the vote range centering on the straight line having the slope θ that passes through the detected position D10 (likewise, the detected position D4, the detected position D5, the detected position D7, the detected position D8, and the detected position D9), 27 points are calculated as the vote points, and this becomes the maximum vote points. Accordingly, the straight line having the slope θ that passes through the detected position D10, for example, is selected as the final straight line.

In this fitting processing, classification is made in each group formed by the plurality of detected positions within the vote range of the detected position Di for each detected position Di. In a case where the lateral position jump occurs in the history of the detected positions due to the shaking or deflection of the subject vehicle, each of the groups rarely (or never) includes both the detected position before the lateral position jump and the detected position after the lateral position jump. In addition, in a case where the shaking or deflection of the subject vehicle does not occur, each of the groups is likely to include all of the detected positions in the history of the detected positions other than the outlier. In some cases, the group with the maximum vote points becomes the group that fits the best to (is the most appropriate for) the straight line having the slope θ and a plurality of the groups become best-fitting groups.

Hereinafter, the object trajectory prediction processing for straight driving will be described. The system ECU 30 predicts the straight line having the slope θ that passes through the detected position finally selected during the fitting processing as the movement trajectory of the object. This movement trajectory corresponds to a trajectory that is predicted from the plurality of detected positions which are included in the group fitting the best to the straight line having the slope θ.

Hereinafter, the collision position prediction processing will be described. The collision position of the subject vehicle is divided into a plurality of sections at predetermined intervals with regard to each surface of the subject vehicle (front surface, rear surface, right side surface, and left side surface). This sectional division is set in advance by adaptation. In the case of collision position prediction, the section of each surface of the vehicle expected to collide with the object is predicted. The system ECU 30 predicts the position of the subject vehicle expected to collide with the object (surface and section of the subject vehicle) from the movement trajectory of the subject vehicle predicted during the subject vehicle trajectory prediction processing and the movement trajectory of the object predicted during the object trajectory prediction processing during steering or the object trajectory prediction processing for straight driving in a case where the movement trajectory of the subject vehicle and the movement trajectory of the object intersect with each other.

Hereinafter, the collision probability integration processing will be described. In a case where the collision position of the subject vehicle is predicted during the collision position prediction processing, the system ECU 30 calculates the collision probability of each section around the collision prediction position. For example, the collision probability is calculated in a normal distribution shape centering on the collision prediction position or a high collision probability is calculated only at the collision prediction position. In addition, the system ECU 30 adds the calculated collision probability to the previous integrated value for each section of the collision prediction position and integrates the collision probability.

Hereinafter, the collision determination processing will be described. The system ECU 30 determines whether or not the integrated value of the collision probability is equal to or greater than a set collision determination threshold with regard to each section of each collision position on each surface of the subject vehicle (may be only the section where the integrated value is updated during the collision probability integration processing). The collision determination threshold, which is set in advance by adaptation and by an experiment or simulation, is a threshold that is used in determining whether or not the subject vehicle is likely to collide with the object based on the integrated value of the collision probability of each collision prediction position. Then, the system ECU 30 determines that the collision is likely (probability of the collision is high) in a case where the integrated value of the collision probability is equal to or greater than the collision determination threshold and determines that the collision is unlikely (probability of the collision is low) in a case where the integrated value of the collision probability is less than the collision determination threshold.

Hereinafter, the device control processing will be described. In a case where the collision is determined to be likely in the collision determination processing, the system ECU 30 calculates time to collision TTC=(relative distance/relative speed) with respect to the object. Then, the system ECU 30 determines which of the alarm, steering, seat belt, seat, and brake devices (at least one) is to be operated based on the TTC with respect to the object, the collision prediction position, and the integrated value of the collision probability. Then, the system ECU 30 sets a control amount, an output command, or the like for each of the operated devices based on the TTC, the collision prediction position, and the integrated value of the collision probability and transmits the control signal to those relevant among the alarm device 20, the collision avoidance support device 21, the seat belt control device 22, the seat control device 23, and the brake control device 24.

Figure 9:
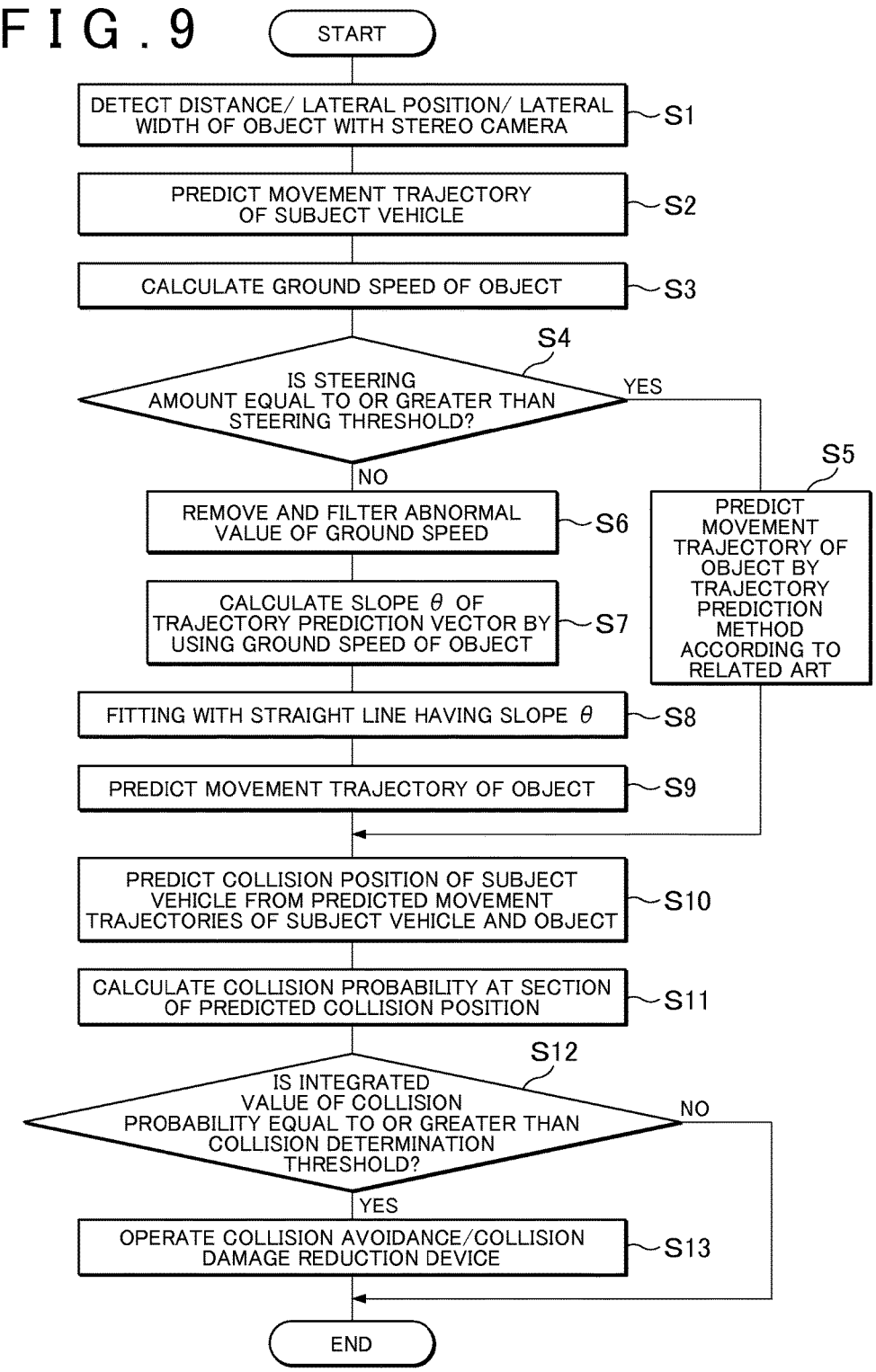
FIG. 9 is a flowchart illustrating the flow of an operation of the collision prediction device according to this embodiment.
Figure 10:
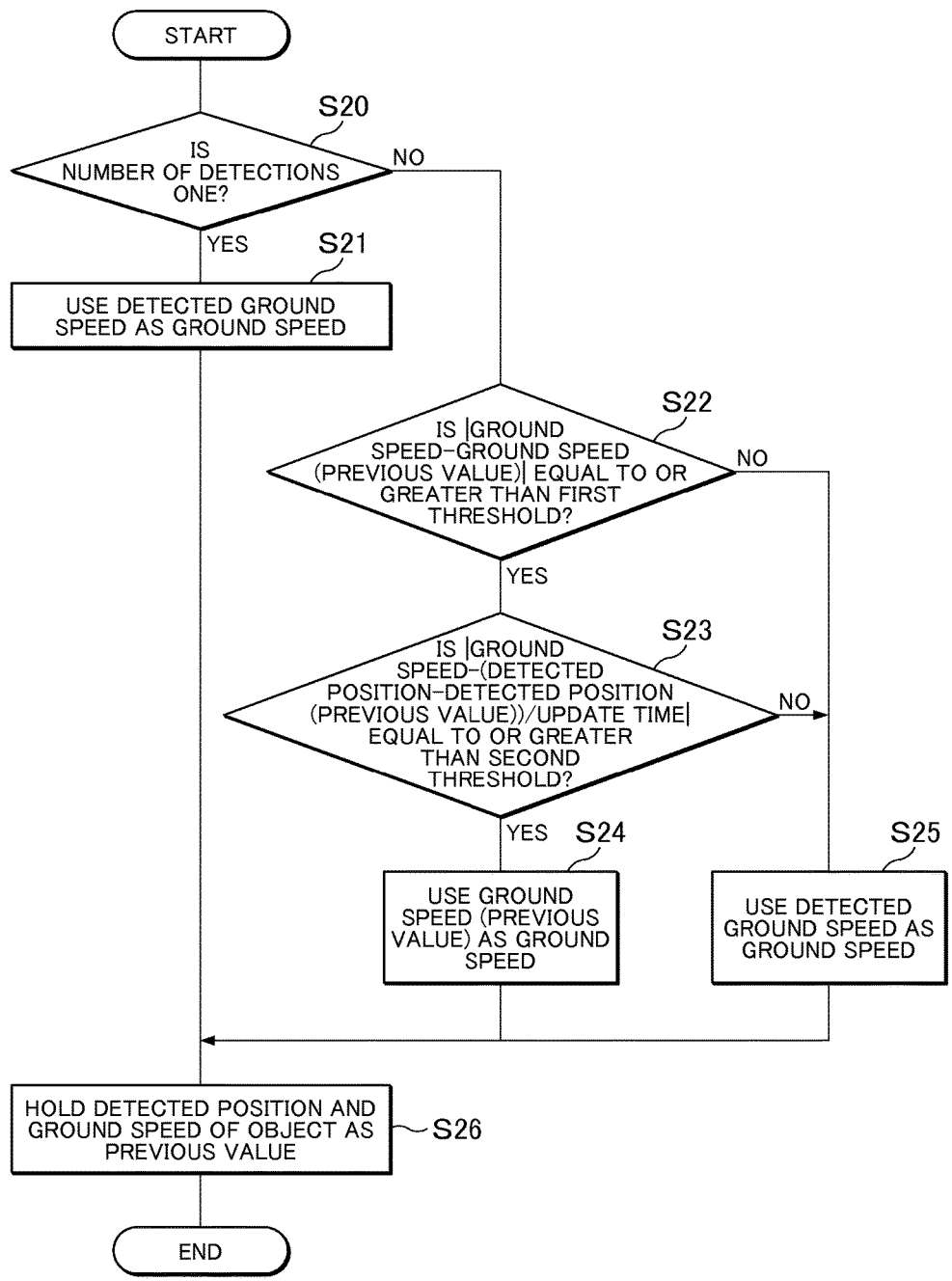
FIG. 10 is a flowchart illustrating the flow of the abnormal value removal processing pertaining to the flowchart that is illustrated in FIG. 9.
Figure 11:
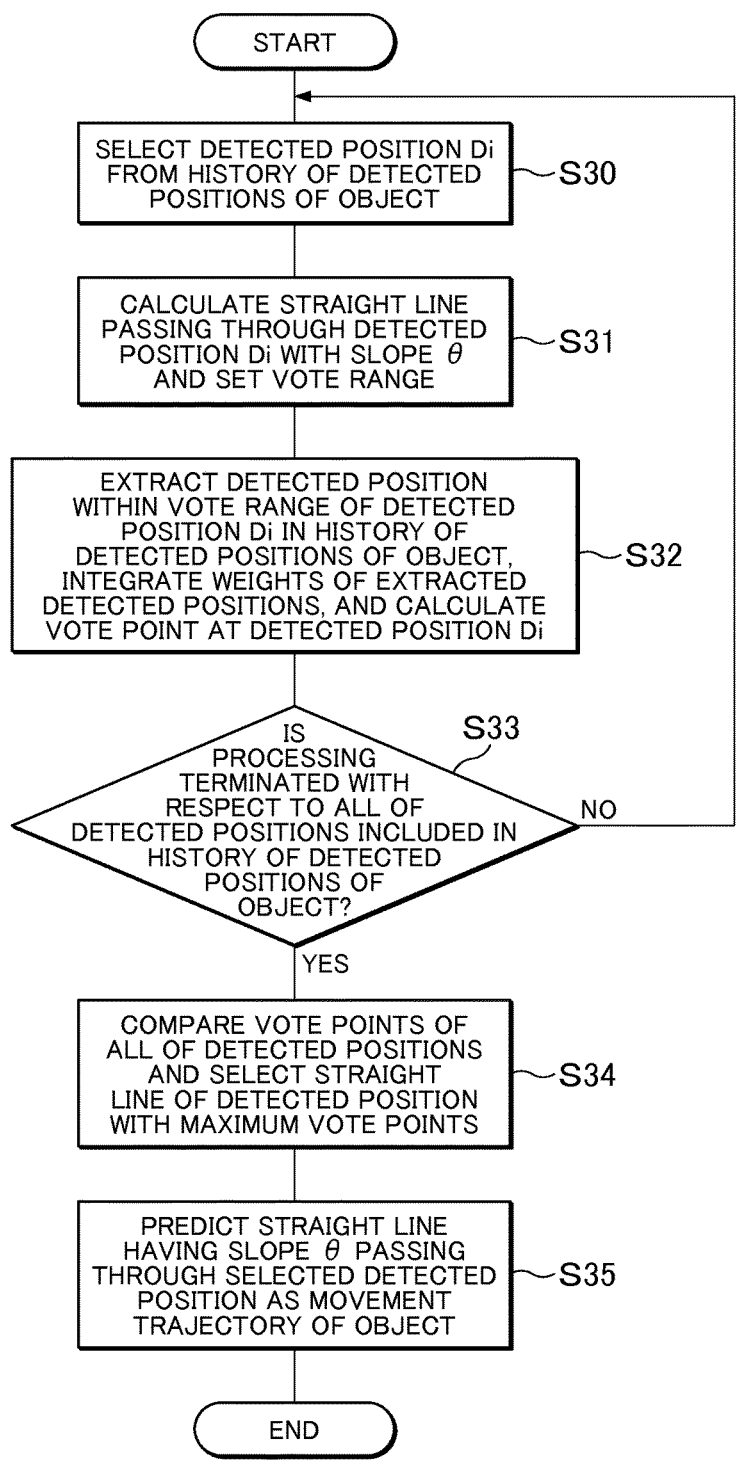
FIG. 11 is a flowchart illustrating the flows of the fitting processing and the object trajectory prediction processing for straight driving pertaining to the flowchart that is illustrated in FIG. 9.

An operation of the collision prediction device 1 will be described with reference to FIG. 1 and along the flowchart that is illustrated in FIG. 9. The abnormal value removal processing will be described along the flowchart that is illustrated in FIG. 10 while the fitting processing and the object trajectory prediction processing for straight driving will be described along the flowchart that is illustrated in FIG. 11. FIG. 9 is a flowchart illustrating the flow of the operation of the collision prediction device according to this embodiment. FIG. 10 is a flowchart illustrating the flow of the abnormal value removal processing pertaining to the flowchart that is illustrated in FIG. 9. FIG. 11 is a flowchart illustrating the flows of the fitting processing and the object trajectory prediction processing for straight driving pertaining to the flowchart that is illustrated in FIG. 9. The collision prediction device 1 repeatedly performs the following operation at regular time intervals.

The stereo camera 10 performs imaging with each of the pair of right and left cameras, performs the object detection processing by using each of the right and left images (stereo images), and acquires the positional information on the object (distance, lateral position, and the like), the lateral width, and the like in a case where the object (target) can be detected (S1). Then, the stereo camera 10 transmits the information on the presence or absence of the object to the system ECU 30. In a case where the objects can be detected, the stereo camera 10 transmits the stereo camera signal including the positional information on each object or the like to the system ECU 30. The system ECU 30 receives the stereo camera signal. In a case where the object is present, the system ECU 30 acquires the positional information on each object or the like and holds (records) the positional information or the like in the RAM. In a case where the object is absent, this processing is terminated.

The steering angle sensor 11 detects the steering angle and transmits the steering angle signal to the system ECU 30. The system ECU 30 receives the steering angle signal and acquires the steering angle. The yaw rate sensor 12 detects the yaw rate and transmits the yaw rate signal to the system ECU 30. The system ECU 30 receives the yaw rate signal and acquires the yaw rate. The vehicle wheel speed sensor 13 for each vehicle wheel detects the rotation pulse number of the vehicle wheel and transmits the vehicle wheel speed signal to the system ECU 30. The system ECU 30 receives the vehicle wheel speed signal regarding each vehicle wheel, calculates the vehicle wheel speeds from the rotation pulse numbers of the respective vehicle wheels, and calculates the vehicle body speed (subject vehicle speed) from the vehicle wheel speed of each wheel.

In a case where the object is present, the system ECU 30 predicts the movement trajectory of the subject vehicle from the vehicle speed history, the yaw rate history, and the steering angle history of the subject vehicle (S2). In addition, the system ECU 30 calculates, for each object, the relative vector of the current value of the detected position of the object pertaining to a case where the fixed object is the reference and the relative vector of the previous value of the detected position pertaining to a case where the same fixed object is the reference, calculates the movement vector from the previous value of the detected position to the current value of the detected position from the two relative vectors, and calculates (detects) the ground speed of the object from the movement vector (S3).

The system ECU 30 determines whether or not the steering amount of the subject vehicle (additional steering amount, cutback amount) is equal to or greater than the steering threshold (S4). In a case where it is determined in S4 that the steering amount is equal to or greater than the steering threshold (in a case where the subject vehicle is turning), the system ECU 30 predicts, for each object, the movement trajectory of the object from the history of the detected positions of the object by using trajectory prediction means according to the related art (S5).

In a case where it is determined in S4 that the steering amount is less than the steering threshold (in a case where the subject vehicle is driving straight), the system ECU 30 performs the abnormal value removal (filtering) with respect to the ground speed detected in S3 for each object (S6). Specifically, the system ECU 30 determines whether or not the ground speed is detected once as illustrated in the flowchart in FIG. 10 (S20). In a case where it is determined in S20 that the ground speed is detected once, the system ECU 30 uses the currently-detected ground speed as the ground speed in the following processing (S21). In a case where it is determined in S20 that the ground speed is detected at least twice, the system ECU 30 determines whether or not the absolute value of the difference between the currently-detected ground speed and the previous value of the ground speed is equal to or greater than the first threshold (S22). In a case where it is determined in S22 that the absolute value is less than the first threshold, the system ECU 30 uses the currently-detected ground speed as the ground speed in the following processing (S25). In a case where it is determined in S22 that the absolute value is equal to or greater than the first threshold, the system ECU 30 determines whether or not the absolute value of the difference between the currently-detected ground speed and the speed obtained by dividing the difference between the current value and the previous value of the detected position of the object (lateral position, in particular) by the update time is equal to or greater than the second threshold (S23). In a case where it is determined in S24 that the absolute value is equal to or greater than the second threshold, the system ECU 30 uses the previous value of the ground speed as the ground speed in the following processing (S24). In a case where it is determined in S23 that the absolute value is less than the second threshold, the system ECU 30 uses the currently-detected ground speed as the ground speed in the following processing (S25). Then, the system ECU 30 holds the currently-detected position and the ground speed of the object as the previous value (S26).

Then, the system ECU 30 calculates, for each object, the slope θ of the trajectory prediction vector by using the vehicle speed of the subject vehicle and the ground speed of the object (S7). Then, the system ECU 30 performs, for each object, the fitting with respect to the history of the detected positions of the object held in the RAM with the straight line having the slope θ (S8) and predicts the best-fitting straight line as the movement trajectory of the object (S9). Specifically, the system ECU 30 selects the detected position Di in order from the history of the detected positions of the object as illustrated in the flowchart in FIG. 11 (S30). Then, the system ECU 30 calculates the straight line passing through the detected position Di with the slope θ and sets the vote range centering on this straight line (S31). In addition, the system ECU 30 extracts the detected positions within the vote range of the detected position Di in the history of the detected positions of the object, integrates the weights of the extracted detected positions, and calculates the vote points at the detected positions Di (S32). The system ECU 30 determines the termination or non-termination of the processing with respect to all of the detected positions included in the history of the detected positions of the object (S33). In a case where it is determined in S33 that the processing with respect to all of the detected positions is not terminated, the system ECU 30 returns to the processing of S30 and selects the next detected position. In a case where it is determined in S33 that the processing with respect to all of the detected positions is terminated, the system ECU 30 compares the vote points of all of the detected positions to one another and selects the straight line of the detected position with the maximum vote points (S34). Then, the system ECU 30 predicts the straight line having the slope θ that passes through the selected detected position as the movement trajectory of the object (S35).

The system ECU 30 predicts, for each object, the position of the collision with the subject vehicle from the movement trajectory of the subject vehicle and the movement trajectory of the object (S10). Then, the system ECU 30 integrates, for each object, the collision probability with the section of the predicted collision position (S11). In a case where the movement trajectory of the subject vehicle and the movement trajectory of the object do not intersect with each other, the collision position is not predicted and the processing of S11 is not performed.

Then, the system ECU 30 determines, for each object, whether or not the subject vehicle and the object are likely to collide with each other based on whether or not the integrated value of the collision probability at each collision prediction position is equal to or greater than the collision determination threshold (S12). In a case where it is determined in S12 that the integrated value is less than the collision determination threshold (in a case where the collision is unlikely), the system ECU 30 terminates this processing. In a case where it is determined in S12 that the integrated value is equal to or greater than the collision determination threshold (in a case where the collision is likely), the system ECU 30 determines, for each object, which of the alarm, steering, seat belt, seat, and brake devices is to be operated based on the time to collision (TTC), the collision prediction position, and the integrated value of the collision probability for collision avoidance/collision damage reduction, sets the control amount or the like for the devices determined to be operated, and transmits the control signal to those relevant among the alarm device 20, the collision avoidance support device 21, the seat belt control device 22, the seat control device 23, and the brake control device 24 (S13). The alarm device 20 outputs the alarm based on the alarm control signal in a case where the alarm control signal is received from the system ECU 30. The collision avoidance support device 21 performs the steering control based on the collision avoidance control signal in a case where the collision avoidance control signal is received from the system ECU 30. The seat belt control device 22 controls the seat belt clamping force based on the seat belt control signal in a case where the seat belt control signal is received from the system ECU 30. The seat control device 23 controls the position and posture of the seat based on the seat control signal in a case where the seat control signal is received from the system ECU 30. The brake control device 24 performs the brake control based on the brake control signal in a case where the brake control signal is received from the system ECU 30.

The collision prediction device 1 predicts the movement trajectory of the object by performing the fitting with respect to the history of the relative detected positions of the object with the straight line having the slope of the trajectory prediction vector based on the ground speed of the object, and thus can accurately predict the movement trajectory of the object from the history of the detected positions of the object even in a case where the lateral position jump occurs in the history of the detected positions of the object due to the shaking or deflection of the subject vehicle.

In addition, the collision prediction device 1 uses the position with the maximum vertical edge intensity as the detected position of the object, and thus variations in the history of the detected positions of the object can be suppressed and the movement trajectory of the object can be accurately predicted. The collision prediction device 1 is especially effective for an object with a changing shape such as the pedestrian. The collision prediction device 1 performs the fitting with the position in the history of the detected positions of the object that is closer in time to the present having a greater weight, and thus the movement trajectory of the object can be more accurately predicted. The collision prediction device 1 does not use the ground speed of the object in the calculation of the trajectory prediction vector (slope, in particular) in a case where the ground speed of the object is the abnormal value, and thus a decline in the accuracy of the trajectory prediction vector can be suppressed and a decline in movement trajectory prediction accuracy can be suppressed.

The embodiment of the invention has been described above. The invention is not limited to the embodiment described above and can be modified in various forms.

For example, although the movement trajectory of the object is predicted, the probability of the collision with the subject vehicle is determined by the use of the movement trajectory of the object, and a device that performs support for collision avoidance and collision damage reduction in a case where the collision is likely is applied in this embodiment, the invention may also be applied to another driving support device that performs another type of support by the use of the predicted movement trajectory of the object or may also be applied to a movement trajectory predicting device that performs solely the prediction of the movement trajectory of the object. Although this embodiment is applied to a device that is pre-mounted on the vehicle, this embodiment may also be applied to a device that is incorporated into the vehicle.

This embodiment uses the stereo camera as the external sensor that detects the object around the subject vehicle. However, other types of external sensors such as a single-lens camera-based image sensor (one capable of detecting even the distance and the lateral position of the object with a single lens) and a radar sensor such as a laser radar and a millimeter wave radar may also be used as the external sensor. In addition, the stereo camera as the external sensor may be subjected to fusion with a radar sensor as a device operation condition.

This embodiment is configured to perform detection from the subject vehicle by the use of the stereo camera of the external sensor for the acquisition of the ground speed of the object. However, the configuration of the detection from the subject vehicle may also use another external sensor such as the radar sensor, may be based on reception via communication with the object after detection by the use of a device (mobile phone, smart phone, and the like) held by the object (for example, configuration in which the speed that is detected by the device carried by the pedestrian is received via pedestrian-to-vehicle communication in a case where the object is the pedestrian), or may be based on detection by the use of roadside infrastructure (fixed-point camera, radar, and the like) and reception via road-to-vehicle communication to and from the roadside infrastructure. The configuration for the detection of the object and the configuration for the acquisition of the ground speed of the object are possible even with different sensors and different ECUs, and the configurations are not particularly limited.

In this embodiment, each of the alarm, steering, seat belt, seat, and brake devices is shown as the device that is operated in a case where the collision is likely. However, at least one of the devices may be used or another device (actuator) may be used.

This embodiment shows examples of the collision position prediction using the movement trajectory of the object and the movement trajectory of the subject vehicle and the collision determination using the integration of the collision probability of each collision prediction position. However, a known technique according to the related art is also applicable with regard to the processing related to the collision.

This embodiment has a configuration in which the fitting is performed based on the setting of the vote range centering on the straight line having the slope θ which passes through the detected position and the majority decision on the vote point regarding the detected position within the vote range. However, the fitting may be performed by another method such as the least squares method. In a case where it is assumed that the detection accuracy regarding the detected position of the object is high and the detected position has no outlier, coping with respect to the outlier may not be performed during the fitting.

This embodiment has a configuration in which the fitting is performed with the weight set for each detected position of the object. However, the fitting may also be performed without the weight setting.

This embodiment has a configuration in which the position with the maximum vertical edge intensity is used as the detected position of the object. However, the use of another position such as the central position of the detected range of the detected object may take the place of the use of the vertical edge intensity regarding this configuration. In a case where the object is the vehicle or the like, in particular, the shape shows no particular change during a movement, and thus the vertical edge intensity may not be used. Examples of another method using the vertical edge intensity include a method in which the vertical edge intensity is used as the detected position of the object in a case where the vertical edge intensity exceeds a reference threshold and a method facilitating the use of the vertical edge intensity as the detected position of the object by performing more weighting as the vertical edge intensity increases.

This embodiment has a configuration in which the abnormal value removal is performed with regard to the ground speed. However, the abnormal value removal may not be performed in a case where it is assumed that the ground speed detection accuracy is high and the ground speed has no abnormal value.

INDUSTRIAL APPLICABILITY

The invention, which is mounted on a vehicle, can be used in movement trajectory prediction for predicting the movement trajectory of an object from the history of the detected positions of the object around the vehicle.

REFERENCE SIGNS LIST

1 . . . COLLISION PREDICTION DEVICE, 10 . . . STEREO CAMERA, 11 . . . STEERING ANGLE SENSOR, 12 . . . YAW RATE SENSOR, 13 . . . VEHICLE WHEEL SPEED SENSOR, 20 . . . ALARM DEVICE, 21 . . . COLLISION AVOIDANCE SUPPORT DEVICE, 22 . . . SEAT BELT CONTROL DEVICE, 23 . . . SEAT CONTROL DEVICE, 24 . . . BRAKE CONTROL DEVICE, 30 . . . SYSTEM ECU

The invention claimed is:

1. A movement trajectory predicting device predicting a movement trajectory of an object around a vehicle, the device comprising:
  an object detection unit configured to acquire a position of the object around the vehicle;
  a speed acquisition unit configured to acquire a ground speed of the object, which is the absolute speed of the object with respect to the ground, by calculating the difference between a current value of the detected position of the object and a position of a fixed object on a road, calculating the difference between a previous value of the detected position of the object and the position of the fixed object on the road, calculating a movement vector from the previous value of the detected position of the object to the current value of the detected position of the object by using the calculated difference between the current value of the detected position of the object and the position of the fixed object on the road and the calculated difference between the previous value of the detected position of the object and the position of the fixed object on the road, and dividing an amount of movement of the movement vector by an update time;

a relative movement vector calculation unit configured to calculate a relative movement vector of the object with respect to the vehicle by using speed information on the vehicle and the ground speed of the object acquired by the speed acquisition unit;

a classification unit configured to record positions in the movement trajectory of the object acquired by the object detection unit and to classify the recorded positions into a plurality of groups based on the relative movement vector calculated by the relative movement vector calculation unit; and a movement trajectory prediction unit configured to predict the movement trajectory of the object based on a plurality of positions of the object included in at least one of the groups classified by the classification unit.

2. The movement trajectory predicting device according to claim 1,
wherein the object detection unit detects the object by edge processing with respect to an image captured by a camera, and
wherein the classification unit promotes use of the position as the position of the object as the position has a higher vertical edge intensity in the image regarding the classification of the recorded positions of the object.

3. The movement trajectory predicting device according to claim 1,
wherein the classification by the classification unit is not performed in a case where a steering amount of the vehicle is equal to or greater than a predetermined amount.

4. The movement trajectory predicting device according to claim 1,
wherein the classification unit performs the classification while increasing a weight for the position among the recorded positions of the object as the position becomes closer in time to the present.

5. The movement trajectory predicting device according to claim 1,
wherein the relative movement vector calculation unit does not use the ground speed of the object that has a difference from a previous value of the ground speed equal to or greater than a first threshold and has a difference from a speed obtained from a difference between the positions of the object equal to or greater than a second threshold in calculating the relative movement vector.

6. A movement trajectory predicting method for predicting a movement trajectory of an object around a vehicle, the method comprising:
acquiring a position of the object around the vehicle;
acquiring a ground speed of the object, which is the absolute speed of the object with respect to the ground, by calculating the difference between a current value of the detected position of the object and a position of a fixed object on a road, calculating the difference between a previous value of the detected position of the object and the position of the fixed object on the road, calculating a movement vector from the previous value of the detected position of the object to the current value of the detected position of the object by using the calculated difference between the current value of the detected position of the object and the position of the fixed object on the road and the calculated difference between the previous value of the detected position of the object and the position of the fixed object on the road, and dividing an amount of movement of the movement vector by an update time;
calculating a relative movement vector of the object with respect to the vehicle by using speed information on the vehicle and the ground speed of the object;
recording positions in the movement trajectory of the object acquired in the acquiring the position of the object and classifying the recorded positions into a plurality of groups based on the calculated relative movement vector; and
predicting the movement trajectory of the object based on a plurality of positions of the object included in at least one of the classified groups;
wherein the acquiring the position of the object is excuted by an object detection unit;
wherein the acquiring the ground speed of the object is excuted by a speed acquisition unit;
wherein the calculating the relative movement vector of the object is executed by a relative movement vector calculation unit;
wherein the recording the positions in the movement trajectory of the object is executed by a classification unit; and
wherein predicting the movement trajectory of the object is executed by a movement trajectory prediction unit.

7. The movement trajectory predicting device according to claim 1,
wherein the speed acquisition unit is further configured to acquire the ground speed of the object based on reception of a speed detected by the object based on communication with the object.

8. The movement trajectory predicting device according to claim 1,
wherein the speed acquisition unit is further configured to acquire the ground speed of the object via road-to-vehicle communication based on reception of the speed of the object detected by roadside infrastructure.

* * * * *